United States Patent
Liu

(10) Patent No.: US 12,420,807 B2
(45) Date of Patent: Sep. 23, 2025

(54) DRIVING SAFETY MANAGEMENT SYSTEM BASED ON DRIVER EMOTION AND FATIGUE DEGREE ANALYSIS

(71) Applicant: THE THIRD RESEARCH INSTITUTE OF MINISTRY OF PUBLIC SECURITY, Shanghai (CN)

(72) Inventor: Caixia Liu, Shanghai (CN)

(73) Assignee: THE THIRD RESEARCH INSTITUTE OF MINISTRY OF PUBLIC SECURITY, Shanghai (CN)

( * ) Notice: Subject to any disclaimer, the term of this patent is extended or adjusted under 35 U.S.C. 154(b) by 0 days.

(21) Appl. No.: 18/681,959

(22) PCT Filed: Nov. 4, 2022

(86) PCT No.: PCT/CN2022/129872
§ 371 (c)(1),
(2) Date: Feb. 7, 2024

(87) PCT Pub. No.: WO2023/236433
PCT Pub. Date: Dec. 14, 2023

(65) Prior Publication Data
US 2024/0343254 A1 Oct. 17, 2024

(30) Foreign Application Priority Data
Jun. 7, 2022 (CN) .......................... 202210642174.2

(51) Int. Cl.
*B60W 40/08* (2012.01)
*B60W 10/18* (2012.01)
(Continued)

(52) U.S. Cl.
CPC ............ *B60W 40/08* (2013.01); *B60W 10/18* (2013.01); *B60W 30/146* (2013.01);
(Continued)

(58) Field of Classification Search
CPC .... B60W 40/08; B60W 10/18; B60W 30/146; B60W 50/14; B60W 2556/45;
(Continued)

(56) References Cited

U.S. PATENT DOCUMENTS 10,937,334 B2 * 3/2021 Ryuzaki .................. G10L 15/22
11,279,204 B2 * 3/2022 Youn .................. B60H 1/00821
(Continued)

FOREIGN PATENT DOCUMENTS

| CN | 101673464 | 3/2010 |
| CN | 106976460 | 7/2017 |

(Continued)

OTHER PUBLICATIONS

Liu, Caixia; International Search Report and Written Opinion for PCT/CN2022/129872, filed Nov. 4, 2022, mailed Feb. 27, 2023, 15 pages.

*Primary Examiner* — Naomi J Small
(74) *Attorney, Agent, or Firm* — Taylor Duma LLP

(57) ABSTRACT

The present invention discloses a driving safety management system based on driver emotion and fatigue analysis. The system performs emotion recognition and/or sensor monitoring data analysis, and performs operations such as automatic speed limitation, speed control and braking to control vehicle actions. The system monitors a driver emotion and a fatigue status in real time during driving, and controls a vehicle driving status and/or issues a safety warning to a driver according to a monitoring result, so as to ensure the traffic safety of various vehicles from the perspective of the driver.

11 Claims, 4 Drawing Sheets

(51) Int. Cl.
*B60W 30/14* (2006.01)
*B60W 50/14* (2020.01)
*G06V 20/59* (2022.01)
*G06V 40/16* (2022.01)

(52) U.S. Cl.
CPC .......... *B60W 50/14* (2013.01); *G06V 20/597* (2022.01); *G06V 40/174* (2022.01); *B60W 2040/0818* (2013.01); *B60W 2040/0881* (2013.01); *B60W 2050/143* (2013.01); *B60W 2420/403* (2013.01); *B60W 2540/229* (2020.02); *B60W 2556/45* (2020.02)

(58) Field of Classification Search
CPC ... B60W 2540/229; B60W 2040/0818; B60W 2040/0881; B60W 2050/143; B60W 2420/403; G06V 40/174; G06V 20/597

USPC ........................................................ 340/576
See application file for complete search history.

(56) References Cited

U.S. PATENT DOCUMENTS

| | | | |
|---|---|---|---|
| 2018/0050696 A1 | 2/2018 | Misu et al. | |
| 2021/0034891 A1* | 2/2021 | Yamataka | G06V 40/176 |
| 2021/0089048 A1* | 3/2021 | Tran | B60R 25/257 |
| 2022/0176996 A1* | 6/2022 | Park | B60W 60/0013 |

FOREIGN PATENT DOCUMENTS

| | | |
|---|---|---|
| CN | 110268681 | 9/2019 |
| CN | 114802266 | 7/2022 |
| CN | 114834474 | 8/2022 |
| CN | 115056786 | 9/2022 |

\* cited by examiner

DRIVING SAFETY MANAGEMENT SYSTEM BASED ON DRIVER EMOTION AND FATIGUE DEGREE ANALYSIS

CROSS-REFERENCE TO RELATED APPLICATIONS

The present application is a National Stage application of PCT international application: PCT/CN2022/129872, filed on 4 Nov. 2022, the disclosure of which is hereby incorporated by reference in its entirety.

TECHNICAL FIELD

The present invention relates to automobile driving safety monitoring technologies, and specifically, to driving safety monitoring of all commercial vehicles such as road passenger transport, tourist passenger transport, hazardous chemical transport vehicles, freight vehicles, school buses, buses, taxis, online car-hailing or rental cars on various platforms, non-commercial transport vehicles, and private vehicles.

BACKGROUND

With the rapid development of social economy, the total road mileage has increased rapidly, and the number of vehicles driving on the roads has also increased. With the development of transportation and the increase of vehicles, the number of road traffic accidents is also rising.

Among the three elements of people, vehicles, and road environment that cause traffic accidents, the factor of people accounts for more than 55%, and traffic accidents caused by abnormal driver emotions and fatigue driving account for nearly 80%.

Studies have shown that the emotions and statuses of car drivers have a great influence on safe driving. When the driver is satisfied, happy, pleased, and joyful, the reaction sensitivity is improved, the driver is full of energy and concentrated, and can observe and analyze the situation sensitively, the operation is fast, agile, and timely, and the driving errors are fewer, which guarantees driving safety. Conversely, when the driver has negative emotions such as disgust, anger, fear, or sorrow, the ability to feel is reduced, the energy is scattered, and the driver is listless, unresponsive, slow in operation, and sometimes makes mistakes, which is a potential threat to driving safety or even causes traffic accidents.

Besides, after driving continuously for a long time, a driver experiences fatigue and boredom, which leads to the physiological and psychological dysfunctions, and objectively there is a decline in driving skills. Fatigue driving affects the driver's attention, feeling, perception, thinking, judgment, will, decision, movement, and the like, and also reduces driver perception ability and makes the driver distracted, unresponsive, and slow in operation, which can easily lead to traffic accidents.

At present, "road passenger transport vehicles, tourist passenger transport vehicles, and hazardous chemical transport vehicles" are required to be equipped with vehicle-mounted terminals. The transportation industry standard JT/T 794-2019 "Vehicle-mounted Terminal Technical Requirements for Road Transport Vehicle Satellite Positioning System" stipulates that the fatigue driving warning is triggered when a single continuous driving time and a cumulative driving time of a vehicle or a driver exceed fatigue driving time thresholds, and stipulates that the fatigue driving time can be set remotely by a monitoring center. The single continuous driving time is 4 hours by default, and the cumulative driving time is 8 hours by default. According to this regulation, whether the driver has been driving for a long time before driving the current vehicle and the actual fatigue level when driving the current vehicle cannot be determined, and the driver may be actually in a status of fatigue driving before the fatigue driving warning stipulated in JT/T 794-2019 is triggered, and then fatigue driving causes drowsiness, distraction, slow response, decline in judgment ability, increase in operating errors and even trance, resulting in serious traffic accidents such as collisions, rollovers, and falling off cliffs.

Therefore, how to effectively monitor and actively intervene in potential accident risks caused by abnormal emotions or fatigue driving of drivers through effective technical means, and effectively improve the driving safety of all driving vehicles of commercial vehicles, non-commercial transport vehicles, and private vehicles, and especially in the event of an accident, how to ensure the driving safety of the "road passenger transport vehicles, tourist passenger transport vehicles, and hazardous chemical transport vehicles", freight vehicles, and school buses with more serious consequences is an urgent problem to be solved in this field.

SUMMARY

In view that the current road traffic safety accidents are mostly caused by human factors, and in view of the existing problems and loopholes in the vehicle terminal application used for safety supervision of operating vehicles, a driving safety management solution that can effectively monitor the driver emotion and fatigue status is needed, to effectively monitor and actively intervene in the accident risk caused by the driver, overcome the technical defects in the safety supervision of various operating vehicles, resolve the risk loopholes in the existing application solution, and eliminate the safety risks caused by the driver.

For this reason, the purpose of the present invention is to provide a driving safety management system based on driver emotion and fatigue analysis, which uses a driver emotion and fatigue analysis technology to monitor the driver status in real time, implements linkage with the vehicle control, and effectively warns and actively intervenes in potential accident risks that may be caused by a driver. This avoids that the driver drives the vehicle in an abnormal emotion status and fatigue status that hinders safe driving, ensures that the driver drives the vehicle safely in a normal emotion status, mental status, and physical status, and ensures that the vehicle performs active intelligent safety prevention and control when the driver has abnormal emotions and a fatigue status, so as to improve vehicle running safety.

In order to achieve the above object, the driving safety management system based on driver emotion and fatigue analysis provided by the present invention includes:

a driver emotion/fatigue monitoring unit, where the driver emotion/fatigue monitoring unit monitors a driver emotion and/or physical status in real time and performs emotion recognition and/or fatigue determination, and is directly associated with a vehicle control unit or associated with the vehicle control unit through a vehicle-mounted gateway unit according to a real-time emotion recognition result and/or a fatigue determination result, to control a vehicle running status;

the vehicle-mounted gateway unit, respectively associated with the driver emotion/fatigue monitoring unit, the vehicle control unit, a warning prompt unit, and a remote management unit: where the vehicle-mounted gateway unit can also cooperate with the driver emotion/fatigue monitoring unit to perform emotion recognition and/or fatigue status determination;

the vehicle control unit, linked to a speed control system and a braking system of the vehicle and associated with the vehicle-mounted gateway unit and the driver emotion/fatigue monitoring unit, where the vehicle control unit controls the vehicle driving status according to a driver real-time emotion status analysis result and a fatigue determination result sent by the driver emotion/fatigue monitoring unit or the vehicle-mounted gateway unit;

the warning prompt unit, respectively connected and coordinated with the driver emotion/fatigue monitoring unit and the vehicle-mounted gateway unit; and the remote management unit, where the remote management unit cooperates with the driver emotion/fatigue monitoring unit to complete driver emotion recognition and/or fatigue status determination through the vehicle control unit, and can give corresponding vehicle management and driver management control instructions and feed back the instructions to the vehicle-mounted gateway unit.

Further, the driver emotion/fatigue monitoring unit includes a real-time emotion recognition module, a fatigue status monitoring module and an intelligent calculation and analysis module.

The real-time emotion recognition module is configured to obtain the current driver facial expression dynamics, and transmit the obtained facial expression dynamics to an intelligent calculation and analysis module of the real-time emotion recognition module or a shared intelligent calculation and analysis module of the driver emotion/fatigue monitoring unit or an intelligent emotion analysis module of the vehicle-mounted gateway unit or an intelligent emotion analysis module of the remote management unit through the vehicle-mounted gateway unit.

The fatigue status monitoring module is configured to obtain current driver fatigue status monitoring information, and transmit the obtained information to a fatigue status determination module of the fatigue status monitoring module or the shared intelligent calculation and analysis module of the driver emotion/fatigue monitoring unit or a fatigue status determination module of the vehicle-mounted gateway unit or a fatigue status determination module of the remote management unit through the vehicle-mounted gateway unit.

The intelligent calculation and analysis module is configured to perform intelligent calculation and analysis on information and data acquired by the real-time emotion recognition module and the fatigue status monitoring module, can be set separately within the real-time emotion recognition module and the fatigue status monitoring module or set independently, and performs intelligent calculation and analysis on the information and data acquired by the real-time emotion recognition module and the fatigue status monitoring module simultaneously.

Further, the real-time emotion recognition module of the driver emotion/fatigue monitoring unit includes a high-speed facial camera device and an intelligent emotion analysis and recognition device:

the high-speed facial camera device is configured to capture the current driver facial expression dynamics; and the intelligent emotion analysis and recognition device is configured to perform intelligent analysis and recognition on the facial expression dynamics captured by the high-speed facial camera device, and determine a current driver real-time emotion status.

Further, the fatigue status monitoring module of the driver emotion/fatigue monitoring unit includes a head and face video acquisition device, a fatigue status analysis device based on video analysis, a seat pressure status acquisition device, and a fatigue status analysis device based on sensor network analysis:

the head and face video acquisition device is configured to acquire current driver head and face movements;

the fatigue status analysis device based on video analysis is configured to intelligently analyze and recognize the head and face movements collected by the head and face video acquisition device and determine current driver real-time fatigue;

the seat pressure status acquisition device is configured to acquire pressure distribution of different points of a seat under the driver's body; and the fatigue status analysis device based on sensor network analysis is configured to intelligently analyze and recognize the pressure distribution of the different points of the seat under the driver's body acquired by the seat pressure status acquisition device, and determine the current driver real-time fatigue.

Further, the intelligent calculation and analysis module of the driver emotion/fatigue monitoring unit includes a data storage device and an edge computing device:

the data storage device is configured to store the information and data acquired by the real-time emotion recognition module and the fatigue status monitoring module; and the edge computing device is configured to perform intelligent calculation and analysis on the information and data acquired by the real-time emotion recognition module and the fatigue status monitoring module.

Further, the driver emotion/fatigue monitoring unit is directly associated with the vehicle control unit or indirectly associated with the vehicle control unit and/or the remote management unit through a vehicle-mounted gateway.

Further, the vehicle-mounted gateway unit includes a network communication module and/or a data storage module and/or an edge computing module:

the network communication module is configured to perform data exchange between the driver emotion/fatigue monitoring unit, the warning prompt unit, the vehicle control unit, and the remote management unit;

the data storage module is configured to store data exchanged between the driver emotion/fatigue monitoring unit, the warning prompt unit, the vehicle control unit, and the remote management unit; and the edge computing module is configured to perform emotion intelligent analysis and recognition and/or fatigue status analysis and determination based on the data exchanged between the driver emotion/fatigue monitoring unit, the warning prompt unit, the vehicle control unit, and the remote management unit.

Further, the network communication module of the vehicle-mounted gateway unit includes a 5G communication device, a CAN bus communication device, a TCP/IP communication device, a Bluetooth (Bluetooth) communication device, and other wireless communication (Wi-Fi, UWB, Zigbee, and the like) devices.

Further, the data storage module of the vehicle-mounted gateway unit includes a built-in data storage device and an external data storage device.

Further, the edge computing module of the vehicle-mounted gateway unit includes an AI intelligent chip with an edge computing function and a terminal SDK with edge computing.

Further, the vehicle-mounted gateway unit is directly associated with the driver emotion/fatigue monitoring unit, the vehicle control unit, the warning prompt unit, and the remote management unit.

Further, the warning prompt unit includes a vehicle local warning prompt subunit and a remote monitoring client software warning prompt subunit.

Further, the warning prompt unit is directly associated with the driver emotion/fatigue monitoring unit and the vehicle-mounted gateway unit.

Further, the vehicle control unit includes an anti-lock brake system (ABS) module and/or a speed limit management module and/or an intelligent brake management module and/or an electronic brake assist (EBA) module.

The anti-lock brake system (ABS) module is configured to: when receiving an abnormal driver status monitoring result sent by the driver emotion/fatigue monitoring unit or forwarded by the vehicle-mounted gateway unit for the driver emotion/fatigue monitoring unit, prevent loss of control over a vehicle driving direction or sideslip during emergency braking.

The speed limit management module is configured to: when receiving an abnormal driver status monitoring result sent by the driver emotion/fatigue monitoring unit or forwarded by the vehicle-mounted gateway unit for the driver emotion/fatigue monitoring unit, control a maximum driving speed of the vehicle.

The intelligent brake management module is configured to: when receiving an abnormal driver status monitoring result sent by the driver emotion/fatigue monitoring unit or forwarded by the vehicle-mounted gateway unit for the driver emotion/fatigue monitoring unit, start the intelligent brake device to reduce a real-time driving speed of the vehicle.

The electronic brake assist (EBA) module is configured to: when receiving an abnormal driver status monitoring result sent by the driver emotion/fatigue monitoring unit or forwarded by the vehicle-mounted gateway unit for the driver emotion/fatigue monitoring unit, quickly activate all the braking force in need of emergency braking, to prevent the driver from being unresponsive in an abnormal status and prevent traffic accidents caused by an excessively long braking distance of the vehicle.

Further, the vehicle control unit is directly associated with the driver emotion/fatigue monitoring unit and the vehicle-mounted gateway unit. When the vehicle control unit receives an abnormal driver status monitoring result, the vehicle control unit controls vehicle speed limitation, speed reduction, or emergency braking.

Further, the remote management unit includes a government industry management client software, an enterprise operation management client software, a driver and passenger service client software, and a communication center.

Further, the government industry management client of the remote management unit includes public security industry management client software, transportation industry management client software, emergency industry management client software, and other industry management client software (for example, insurance industry management client software) according to different industry departments.

Further, the enterprise operation management client of the remote management unit includes consignor management client software, carrier management client software, and consignee management client software according to different users.

Further, the driver and passenger service management client of the remote management unit includes driver service client software and escort (security guard) service client software according to different users.

Further, the communication center of the remote management unit includes a cloud platform, a local server, and a personal mobile intelligent terminal.

Further, the remote management unit receives the driver emotion and fatigue analysis result sent by the vehicle-mounted gateway unit and gives vehicle management and driver management control instructions, or receives a driver emotion and fatigue analysis information acquisition result sent by the vehicle-mounted gateway unit, recognizes, analyze, and determine a driver real-time emotion and/or fatigue status, gives vehicle management and driver management control instructions based on an emotion recognition result and/or a fatigue status determination result, feeds back the instructions to the vehicle-mounted gateway unit, and feeds back the instructions to the warning prompt unit or the vehicle control unit through the vehicle-mounted gateway unit, to send a sound and light warning or a voice prompt or control the vehicle.

The driving safety management system based on driver emotion and fatigue analysis provided by the present invention can monitor the driver emotion and fatigue status in real time during driving, and automatically control the vehicle driving status in a linkage manner through active driving assisted by safety prevention and control according to the monitoring result and give a safety warning to the driver, so as to ensure the safe operation of automobile transportation from the perspective of the driver.

Specifically, the driving safety management system based on driver emotion and fatigue analysis provided by the present invention can monitor the driver facial dynamic expression or facial vibration amplitude and pressure statuses in different areas of the seat under the driver in real time during vehicle driving, comprehensively analyze the driver real-time emotion status, cautiously determine the real-time fatigue level of the driver, automatically control the vehicle to perform automatic speed limitation, speed reduction, or emergency brake according to the emotion status and real-time fatigue status analysis and recognition result, and issue voice prompts or sound and light warnings to effectively warn and actively intervene in potential accident risks that may be caused by driver factors. This avoids that the driver drives the vehicle in an abnormal emotion status that hinders safe driving and in a fatigue status, ensures that the driver drives the vehicle safely in a normal emotion, mental, and physical status, and ensures that the vehicle performs active intelligent safety prevention and control when the driver has abnormal emotions or a fatigue status, so as to improve vehicle running safety.

BRIEF DESCRIPTION OF THE DRAWINGS

The present invention will be further described below in conjunction with the accompanying drawings and specific embodiments.

DETAILED DESCRIPTION

Figure 1:
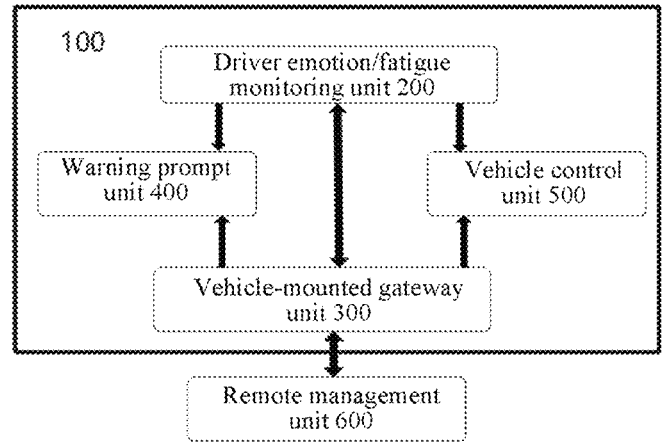
FIG. 1 is a schematic diagram of a composition principle and a usage procedure of a driving safety management system based on driver emotion and fatigue analysis according to an embodiment of the present invention.

In order to make the technical means, creative features, goals and effects achieved by the present invention easy to understand, the present invention will be further described below in conjunction with specific diagrams.

Existing vehicles cannot monitor driver emotions in real time, and some "road passenger transport vehicles, tourist passenger transport vehicles, and hazardous chemical transport vehicles" can only monitor a driver continuous driving time, and determine whether a driver drives in fatigue according to the monitored continuous driving time. The monitored fatigue driving data is only used for follow-up administrative management, and real-time control of vehicles and/or drivers cannot be performed, let alone early warning and intervention of a vehicle driving status and/or a driver driving status. Therefore, the practical application process has many problems and loopholes, especially the real-time and comprehensive aspects of vehicle and/or driver control.

In view of this, in the present invention, the driver real-time emotion and fatigue status is monitored in real time during driving in an innovative manner from the perspective of driver management, the vehicle driving status is controlled in real time in a linkage manner according to the monitoring result and/or a safety warning is given to the driver, so as to give intelligent early warning of potential safety hazards that may be caused by driver factors, and the vehicle driving status can be intelligently controlled in a linkage manner, so as to eliminate potential safety hazards caused by driver factors and ensure the transportation safety of corresponding vehicles from the perspective of driver management.

In this way, the present invention provides a driving safety management system based on driver emotion and fatigue analysis. The monitoring system can monitor the driver facial dynamic expression or facial vibration amplitude and pressure statuses in different areas of the seat under the driver in real time during vehicle driving, comprehensively analyze the driver real-time emotion status, cautiously determine the real-time fatigue level of the driver, automatically control the vehicle to perform automatic speed limitation, speed reduction, or emergency brake according to the emotion status and real-time fatigue status analysis and recognition result, and issue voice prompts or sound and light warnings to effectively warn and actively intervene in potential accident risks that may be caused by driver factors. This avoids that the driver drives the vehicle in an abnormal emotion status that hinders safe driving and in a fatigue status, ensures that the driver drives the vehicle safely in a normal emotion, mental, and physical status, and ensures that the vehicle performs active intelligent safety prevention and control when the driver has abnormal emotions or a fatigue status, so as to avoid transportation safety accidents of corresponding vehicles such as all commercial vehicles such as road passenger transport, tourist passenger transport, hazardous chemical transport vehicles, freight vehicles, school buses, buses, taxis, online car-hailing or rental cars on various platforms, non-commercial transport vehicles, and private vehicles.

FIG. 1 is a schematic diagram of an overall composition principle of a driving safety management system based on driver emotion and fatigue analysis according to the present invention.

As shown in FIG. 1, the driving safety management system based on driver emotion and fatigue analysis mainly includes a driver emotion/fatigue monitoring unit 200, a vehicle-mounted gateway unit 300, a warning prompt unit 400, a vehicle control unit 500, and a remote management unit 600 that cooperate with each other.

The driver emotion/fatigue monitoring unit 200 in this system is arranged in a cab of a vehicle 100 to be monitored, is associated with the vehicle-mounted gateway unit 300, the warning prompt unit 400, and the vehicle control unit 500 of the vehicle, and is associated with the remote management unit 600 through the vehicle-mounted gateway unit 300.

The driver emotion/fatigue monitoring unit 200 can monitor the driver emotion and physical fatigue status in real time, which can be transmitted to the remote management unit 600 through an edge computing module constructed by the monitoring unit, an edge computing module of the vehicle-mounted gateway unit 300 or a network communication module of the vehicle-mounted gateway unit 300 for emotion recognition and fatigue status judgment.

At the same time, the driver emotion/fatigue monitoring unit 200 can obtain, according to the real-time emotion recognition result and the fatigue status determination result, management instructions generated based on a related emotion recognition result and/or fatigue status determination result or obtain the instructions from the remote management unit through the vehicle-mounted gateway unit, is directly associated with the vehicle control unit 500 or is associated with the vehicle control unit 500 through the vehicle-mounted gateway unit 300, and controls the working status of the vehicle anti-lock brake system (ABS) module, a speed limit management module, an intelligent brake management module, or an electronic brake assist (EBA) module to perform a speed limitation, speed control, or speed reduction operation.

As an example, the vehicle 100 to be monitored herein can be all commercial vehicles such as road passenger transport vehicles, tourist passenger transport vehicles, hazardous chemical transport vehicles, freight vehicles, school buses, taxis, online car-hailing vehicles and rental cars on various platforms and non-commercial transport vehicles and private vehicles.

Figure 2:
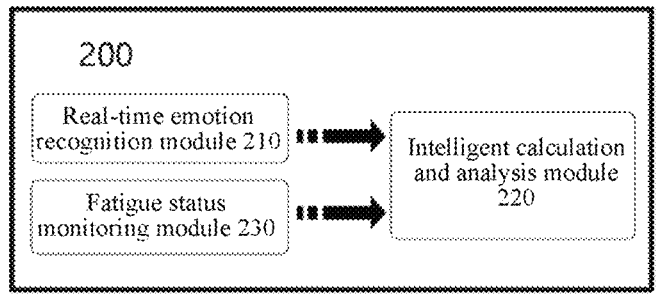
FIG. 2 is a schematic diagram of a composition principle of a driver emotion/fatigue monitoring unit according to an embodiment of the present invention.

FIG. 2 is a schematic diagram of a composition principle of a driver emotion/fatigue monitoring unit based on driver emotion and fatigue analysis according to the present invention.

As shown in FIG. 2, the driver emotion/fatigue monitoring unit 200 provided in this embodiment includes a real-time emotion recognition module 210, an intelligent calculation and analysis module 220, and a fatigue status monitoring module 230 in cooperation with each other.

The real-time emotion recognition module 210 in this unit is configured to obtain the current driver facial expression dynamics, and transmit the obtained facial expression dynamics to an intelligent calculation and analysis module 220 of the real-time emotion recognition module or a shared intelligent calculation and analysis function module 220 of the driver emotion/fatigue monitoring unit or an intelligent emotion analysis function module of the vehicle-mounted gateway unit or an intelligent emotion analysis function module (such as the edge computing module constructed in the vehicle-mounted gateway unit) of the remote management unit through the vehicle-mounted gateway unit.

The fatigue status monitoring module 230 in this unit is configured to obtain current driver fatigue status monitoring information, and transmit the obtained information to a fatigue status determination function module 220 of the fatigue status monitoring module or the shared intelligent calculation and analysis module 220 of the driver emotion/fatigue monitoring unit or a fatigue status determination function module of the vehicle-mounted gateway unit (such as the edge computing module constructed in the vehicle-mounted gateway unit) or a fatigue status determination function module of the remote management unit through the vehicle-mounted gateway unit.

The driver emotion/fatigue monitoring unit 200 can further be provided with a calculation and analysis module 220 as required, and the calculation and analysis module 220 can perform data exchange with the real-time emotion recognition module 210, and as an intelligent emotion analysis functional module cooperating with the real-time emotion recognition module 210, is configured to receive the current driver facial expression dynamic data obtained by the real-time emotion recognition module 210. The dynamic data herein can be videos, pictures, or the like, intelligent emotion analysis is performed based on the data, and a corresponding real-time emotion analysis result is formed.

Furthermore, the calculation and analysis module 220 can perform data exchange with the fatigue status monitoring module 230, and as a fatigue status determination function module cooperating with the fatigue status monitoring module 230, is configured to receive the current driver fatigue status monitoring information obtained by the fatigue status monitoring module 230. The dynamic data herein can be videos, pictures, or the like, intelligent fatigue status determination is performed based on the data, and a corresponding fatigue level for determining a current driver real-time status is formed.

In addition, the calculation and analysis module 220 can be integrated with the real-time emotion recognition module 210 and the fatigue status monitoring module 230 respectively, or set independently from the real-time emotion recognition module 210 and the fatigue status monitoring module 230.

As an example, when the calculation and analysis module 220 is implemented, it can be presented as an edge computing module constructed by the driver emotion/fatigue monitoring unit 200. A specific composition technology can be determined according to the actual needs. For example, it can be implemented based on the edge computing function of hardware of the driver emotion/fatigue monitoring unit 200.

As shown in FIG. 1, the driver emotion/fatigue monitoring unit 200 provided in this way can capture the current driver facial expression dynamics through the real-time emotion recognition module 210 and/or perform intelligent analysis and recognition on the captured facial expression dynamics to determine the current driver real-time emotion status.

The driver emotion/fatigue monitoring unit 200 can capture the current driver facial movement through the fatigue status monitoring module 230 and/or perform intelligent analysis and recognition on the head and facial movements acquired by the head and face video acquisition device, and determine the current driver real-time fatigue level. On this basis, the unit can further perform intelligent analysis and recognition by acquiring the pressure distribution of different points of the seat under the driver's body, to determine the current driver real-time fatigue level: or directly perform intelligent analysis and recognition on the pressure distribution of different points of the seat under the driver's body acquired by the seat pressure status acquisition device, to determine the current driver real-time fatigue level.

When the driver emotion/fatigue monitoring unit 200 performs intelligent analysis and recognition, a corresponding edge computing module may be directly constructed in the driver emotion/fatigue monitoring unit 200 for intelligent analysis and recognition, such as the calculation and analysis module 220.

As an alternative solution, the driver emotion/fatigue monitoring unit 200 can also cooperate with the vehicle-mounted gateway unit 300 to complete the driver emotion and fatigue intelligent analysis and recognition. In this alternative solution, by running the corresponding edge computing module in the vehicle-mounted gateway unit 300, the real-time emotion recognition module 210 in the driver emotion/fatigue monitoring unit 200 transmits the obtained current driver facial expression dynamic data and the fatigue status monitoring module 230 transmits the obtained current driver fatigue status monitoring information to the vehicle-mounted gateway unit 300 synchronously, and the edge computing module running in the vehicle-mounted gateway unit 300 performs intelligent analysis and recognition based on the data, and determines the current driver real-time emotion status and the real-time fatigue level.

As another alternative solution, the driver emotion/fatigue monitoring unit 200 can also cooperate with the vehicle-mounted gateway unit 300 and the remote management unit 600 to complete the driver emotion and fatigue intelligent analysis and recognition. In this alternative solution, the real-time emotion recognition module 210 in the driver emotion/fatigue monitoring unit 200 transmits the obtained current driver facial expression dynamic data and the fatigue status monitoring module 230 transmits the obtained current driver fatigue status monitoring information to the vehicle-mounted gateway unit 300 synchronously, the data is then transmitted to the remote management unit 600 by the vehicle-mounted gateway unit 300, and the remote management unit 600 performs intelligent analysis and recognition based on the data to determine the current driver real-time emotion status and the real-time fatigue level.

In this way, when the driver emotion/fatigue monitoring unit 200 runs, the edge computing module of the driver emotion/fatigue monitoring unit 200, or the edge computing module of the vehicle-mounted gateway unit 300, or the network communication module of the vehicle-mounted gateway unit 300 transmits the data monitored by a corresponding monitoring module to the remote management unit 600 for emotion recognition and/or fatigue status determination.

At the same time, the driver emotion/fatigue monitoring unit 200 can obtain, according to the real-time emotion recognition result and the fatigue status determination result, management instructions generated based on a related emotion recognition result and fatigue status determination result or obtain the instructions from the remote management unit 600 through the vehicle-mounted gateway unit 300, is directly associated with the vehicle control unit 500 or is associated with the vehicle control unit 500 through the vehicle-mounted gateway unit 300, and controls the working status of the vehicle anti-lock brake system (ABS) module, a speed limit management module, an intelligent brake management module, or an electronic brake assist (EBA) module to perform a speed limitation, speed reduction, or emergent brake operation to control the vehicle running status.

As shown in FIG. 1, the vehicle-mounted gateway unit 300 in this system is arranged in the driver compartment of the vehicle 100 to be monitored, and is associated with the driver emotion/fatigue monitoring unit 200, the warning prompt unit 400, the vehicle control unit 500, and the remote management unit 600 of the vehicle.

The vehicle-mounted gateway unit 300 herein has at least a network communication function and/or a data storage function and/or an edge computing function and establishes a communication channel with the remote management unit 600 to recognize and analyze data information generated by the driver emotion/fatigue monitoring unit, or transmit relevant information to the remote management unit for recognition and analysis, and send, to the vehicle control unit and the warning prompt unit, management data information returned by the remote management unit.

Figure 5:
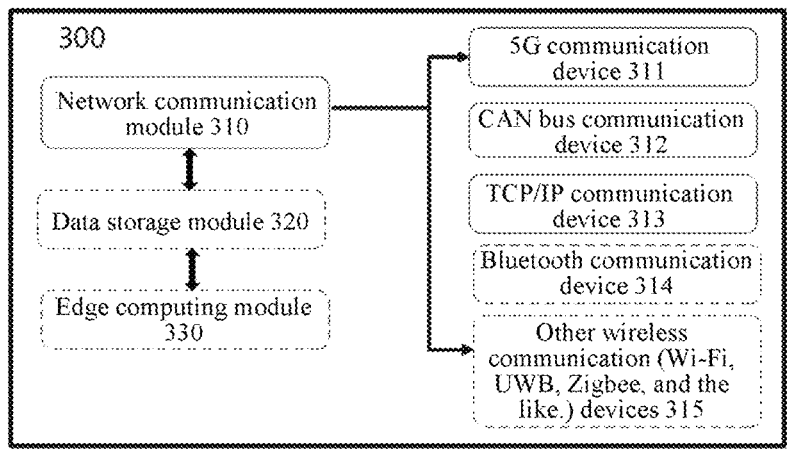
FIG. 5 is a schematic diagram of a composition principle of a vehicle-mounted gateway unit and a network communication module thereof according to an embodiment of the present invention.

FIG. 5 is a schematic diagram of a composition principle of the vehicle-mounted gateway unit 300 and a network communication module thereof in a driving safety management system based on driver emotion and fatigue analysis according to this embodiment.

Based on FIG. 5, the vehicle-mounted gateway unit 300 applied to a driving safety management system in this embodiment includes a network communication module 310 and/or a data storage module 320 and/or an edge computing module 330 in combination or independently. The network communication module 310 is a basic component, that is, a necessary component of the vehicle-mounted gateway unit 300.

As shown in FIG. 1 and FIG. 5, the vehicle-mounted gateway unit 300 provided in this way performs data exchange between the driver emotion/fatigue monitoring unit 200, the warning prompt unit 400, the vehicle control unit 500, and the remote management unit 600 through the network communication module 310.

The vehicle-mounted gateway unit 300 can use the network communication module 310 to forward, to the remote management unit 600, the current driver facial expression dynamic information and the pressure distribution information of different points of the seat under the driver's body or the real-time emotion analysis and recognition result and the fatigue status determination result uploaded by the driver emotion/fatigue monitoring unit 200. Correspondingly, the vehicle-mounted gateway unit 300 can also send corresponding instructions to the vehicle control unit 500 and the warning prompt unit 400 according to the received driver real-time emotion analysis and recognition result and fatigue status determination result: send corresponding instructions to the vehicle control unit 500 and the warning prompt unit 400 based on the real-time emotion analysis and recognition result and the fatigue status determination result obtained by the edge computing module 330 of the vehicle-mounted gateway unit 300: or forward received management instructions of the remote management unit 600 to the driver emotion/fatigue monitoring unit 200 or the warning prompt unit 400 or the vehicle control unit 500.

The vehicle-mounted gateway unit 300 can use the data storage module 320 to store the current driver facial expression dynamic information and the pressure distribution information of different points of the seat under the driver's body uploaded by the driver emotion/fatigue monitoring unit 200.

The vehicle-mounted gateway unit 300 can use the edge computing module 330 to perform emotion intelligent analysis and recognition and fatigue status analysis and determination on the current driver facial expression dynamic information and the pressure distribution information of different points of the seat under the driver's body uploaded by the driver emotion/fatigue monitoring unit 200.

As shown in FIG. 1, the warning prompt unit 400 in this system is arranged in the driver compartment of the vehicle 100 to be monitored, and monitoring client software outside the vehicle and monitoring client software of the remote management unit 600 is associated with the driver emotion/fatigue monitoring unit 200, the vehicle-mounted gateway unit 300, and the remote management unit 600 of the vehicle.

The warning prompt unit 400 herein includes a local sound and light warning device or a voice prompt device and a remote monitoring client warning display device. The local sound and light warning device or the voice prompt device in the warning prompt unit 400 is arranged in the driver compartment of the vehicle and outside the vehicle, and is respectively connected with the driver emotion/fatigue monitoring unit 200 and the vehicle-mounted gateway unit 300. The local warning prompt unit provided in this way can send a voice prompt or sound and light warning according to the driver real-time emotion status and the driving behavior analysis result sent by the driver emotion/fatigue monitoring unit 200 or the vehicle-mounted gateway unit 300.

The remote monitoring client warning display device in the warning prompt unit 400 is arranged on the government industry management client software, enterprise operation management client software, driver and passenger service client software of the remote management unit, and is connected with the vehicle-mounted gateway unit 300. The monitoring client of the warning prompt unit provided in this way sends voice or text prompts according to the driver identity verification result or the driver status monitoring and determination result sent by the vehicle-mounted gateway unit 300.

Figure 6:
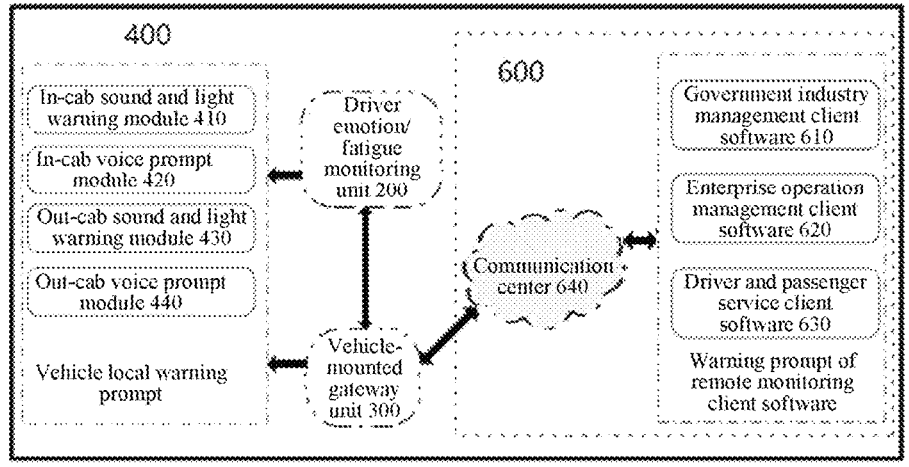
FIG. 6 is a schematic diagram of a composition principle and a usage procedure diagram of a warning prompt unit according to an embodiment of the present invention.

FIG. 6 is a schematic diagram of a composition principle and a usage procedure of the warning prompt unit 400 in the driving safety management system based on driver emotion and fatigue analysis given in this embodiment.

As shown in FIG. 6, the warning prompt unit 400 applied to a driving safety management system in this embodiment includes vehicle local warning prompt subunits and warning prompt subunits of remote monitoring client software such as government industry management client software 610, enterprise operation management client software 620, and driver and passenger service client software 630 in cooperation with each other, such as an in-cab sound and light warning module 410, an in-cab voice prompt module 420, an out-cab sound and light warning module 430, and an out-cab voice prompt module 440.

As shown in FIG. 1 and FIG. 6, the in-cab sound and light warning module 410 of the warning prompt unit 400 provided in this way is used to issue a sound and light warning when the driver emotion recognition result and the fatigue status determination result is abnormal. As an example, the light emitted by the sound and light warning device of the light warning module is generally red by default.

The in-cab voice prompt module 420 is configured to prompt the driver to adjust the emotion or park nearby when the driver emotion recognition result is abnormal, and prompt the driver to concentrate or park nearby when the fatigue status determination result is abnormal. As an example, the in-cab voice prompt module 420 and the in-cab sound and light warning module can be set independently or combined into a voice sound and light warning device.

The out-cab sound and light warning module 430 is configured to issue a sound and light warning to people outside the vehicle when the driver emotion recognition result is seriously abnormal and the fatigue status determination result is seriously abnormal. As an example, the light emitted by the sound and light warning device of the sound and light warning module here is generally red by default, and the volume of the warning sound is enough to alert passers-by in a noisy environment on the road.

The out-cab voice prompt module 440 is configured to issue voice prompts to people outside the vehicle when the driver emotion recognition result is seriously abnormal and the fatigue status determination result is seriously abnormal. As an example, the volume of the voice prompt generated by the out-cab voice prompt module 440 and the volume of the warning sound are enough to cause passers-by to be highly alert in a noisy environment on the road, and the clarity of the voice broadcast of the voice warning content can be clearly understood by the listeners.

The government industry management client software 610 is configured to receive the warning information forwarded by the vehicle-mounted gateway through the communication center when the driver emotion recognition result is abnormal and the fatigue status determination result is abnormal. As an example, when the government industry management client software receives information such as serious abnormalities in the driver emotion recognition result and the fatigue status determination result, the government industry management client software starts the emergency management process according to the emergency plan by default.

The enterprise operation management client software 620 is configured to receive the warning information forwarded by the vehicle-mounted gateway through the communication center when the driver emotion recognition result is abnormal and the fatigue status determination result is abnormal. As an example, when the enterprise operation management client software 620 receives information such as serious abnormalities in the driver emotion recognition result and the fatigue status determination result, the enterprise operation management client software starts the emergency management process according to the emergency plan by default, and simultaneously sends emergency warning information to the government industry management client.

The driver and passenger service client 630 is configured to receive the warning information forwarded by the vehicle gateway through the communication center when the driver emotion recognition result is abnormal and the fatigue status determination result is abnormal, and send a voice prompt with preset content according to different driver and passenger service client user roles, for example, for prompting the driver to adjust the posture for re-check, for prompting the driver to adjust the emotion or for prompting the driver to concentrate or park nearby or the like while sending the warning information. As an example, the driver and passenger service client herein sends a voice prompt while sending warning information, and the content of the voice prompt varies according to different driver and passenger service client user roles. For example, the driver service client voice prompts the driver to adjust the emotion or prompts the driver to concentrate or park nearby; and the escort (safety personnel) service client voice of a transport vehicles for hazardous chemicals prompts the escort (safety personnel) to supervise the driver to adjust the emotion or prompts and supervise the driver to concentrate or park nearby or the like.

As shown in FIG. 1, the vehicle control unit 500 in this system is arranged in the driver compartment of the vehicle 100 to be monitored, and is associated with the driver emotion/fatigue monitoring unit 200, the vehicle-mounted gateway unit 300, and the remote management unit 600 of the vehicle.

The vehicle control unit 500 is arranged in the vehicle cab or the engine compartment of the vehicle, is linked with the starting system, the speed control system, and the braking system of the vehicle, and is associated with the vehicle-mounted gateway unit 300 and the driver emotion/fatigue monitoring unit 200, and is associated with the warning prompt unit 400, the remote management unit 600 and/or the driver emotion/fatigue monitoring unit 200 through the vehicle-mounted gateway unit 300.

The vehicle control unit 500 can control whether the vehicle performs speed limitation, speed reduction, or emergency braking according to the driver real-time emotion status analysis result and the fatigue status determination result sent by the driver emotion/fatigue monitoring unit 200 or the vehicle-mounted gateway unit 300.

Figure 7:
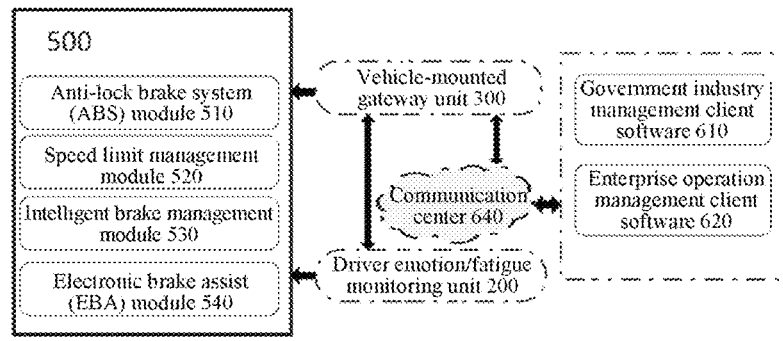
FIG. 7 is a schematic diagram of a composition principle and a usage procedure of a vehicle control unit according to an embodiment of the present invention.

FIG. 7 is a schematic diagram of a composition principle and a usage procedure of a vehicle control unit 500 in a driving safety management system in this embodiment.

Based on FIG. 7, the vehicle control unit 500 provided in this embodiment includes an anti-lock brake system (ABS) module 510 and/or a speed limit management module 520 and/or an intelligent brake management module 530) and/or an electronic brake assist (EBA) module 540) in combination or independently.

As shown in FIG. 1 and FIG. 7, the vehicle control unit 500 provided in this way can use the anti-lock brake system (ABS) module 510 to receive the driver status abnormality monitoring result sent by the driver emotion/fatigue monitoring unit 200, or forwarded by the vehicle-mounted gateway unit 300 for the driver emotion/fatigue monitoring unit 200 or forwarded by the communication center 640 and the vehicle-mounted gateway unit 300 for the enterprise operation management client software 610, and prevent the vehicle from losing control over the driving direction or skidding that may occur during emergency braking.

The vehicle control unit 500 can use the speed limit management module 520 to receive the driver status abnormality monitoring result sent by the driver emotion/fatigue monitoring unit 200, or forwarded by the vehicle-mounted gateway unit 300 for the driver emotion/fatigue monitoring unit 200 or forwarded by the communication center 640) and the vehicle-mounted gateway unit 300 for the enterprise operation management client software 610, and control the maximum driving speed of the vehicle.

The vehicle control unit 500 can use the intelligent brake management module 530 to receive the driver status abnormality monitoring result sent by the driver emotion/fatigue monitoring unit 200, or forwarded by the vehicle-mounted gateway unit 300 for the driver emotion/fatigue monitoring unit 200 or forwarded by the communication center 640 and the vehicle-mounted gateway unit 300 for the enterprise operation management client software 610, and start the intelligent braking device to reduce the real-time driving speed of the vehicle.

The vehicle control unit 500 can use the electronic brake assist (EBA) module 540) to receive the driver status abnormality monitoring result sent by the driver emotion/fatigue monitoring unit 200, or forwarded by the vehicle-mounted gateway unit 300 for the driver emotion/fatigue monitoring unit 200 or forwarded by the communication center 640) and the vehicle-mounted gateway unit 300 for the enterprise operation management client software 610, and quickly start all the braking force when emergency braking is required to prevent traffic accidents at an excessively long brake distance caused by the slow response of the driver under abnormal conditions.

The vehicle control unit 500 is preferably directly associated with the driver emotion/fatigue monitoring unit 200 in deployment application, so that when the vehicle control unit 500 receives a driver status abnormal detection result, the vehicle control unit controls the vehicle to perform speed limitation, speed reduction, or emergency braking: so as to implement different types of precise control over the vehicle in different situations and effectively ensure the driving safety of the vehicle.

As shown in FIG. 1, the remote management unit 600 in this system is set on a cloud platform and/or a local storage server of the relevant government industry authorities of automobile transportation and/or a personal hand-held intelligent terminal of the relevant management personnel, a cloud platform and/or a local storage server of an automobile transportation enterprise and relevant transportation parties and/or a personal hand-held intelligent terminal of the relevant management personnel, and a personal hand-held intelligent terminal of driver and passenger personnel, and is associated with the vehicle-mounted gateway unit 300, and is associated with the driver emotion/fatigue monitoring unit 200, the warning prompt unit 400, and the vehicle control unit 500 through the vehicle-mounted gateway unit 300.

When the remote management unit 600 runs, the remote management unit receives the driver real-time emotion and fatigue status recognition, analysis and determination result sent by the vehicle-mounted gateway unit 300, gives vehicle management and driver management control instructions according to the emotion recognition result and the fatigue status determination result, feeds back the instructions to the vehicle-mounted gateway unit 300, and feeds back the instructions to the warning prompt unit 400 or the vehicle control unit 500 through the vehicle gateway to issue a sound and light warning or a voice prompt, or control the vehicle ACC to open or close or control the vehicle to perform speed limitation, speed reduction, or emergency braking.

Figure 8:
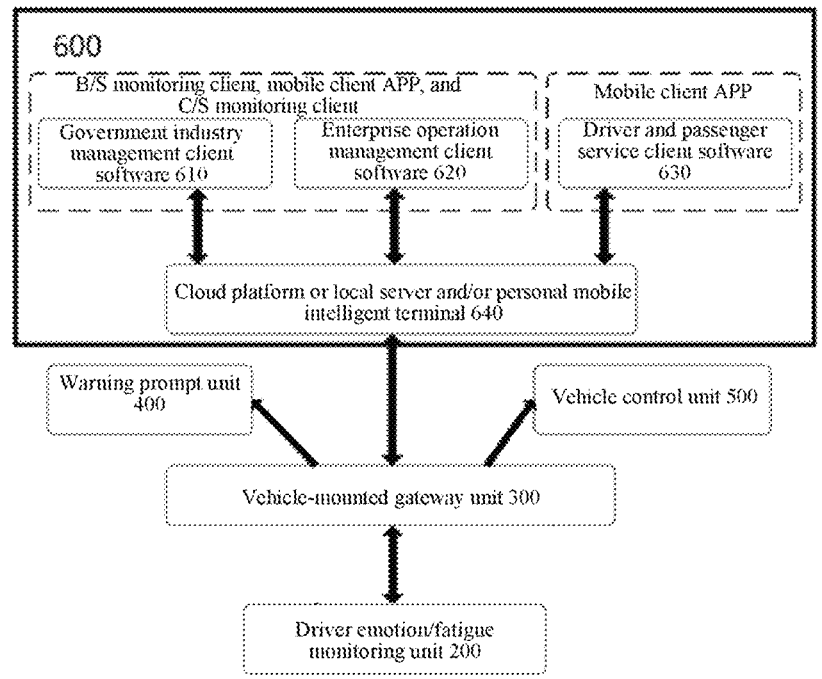
FIG. 8 is a schematic diagram of a composition principle and a usage procedure of a remote management unit according to an embodiment of the present invention.

FIG. 8 is a schematic diagram of a composition principle and a usage procedure of a remote management unit 600 in a driving safety management system in this embodiment.

As shown in FIG. 8, the remote management unit 600 in this embodiment includes government industry management client software 610, enterprise operation management client software 620, driver and passenger service client software 630, and a communication center 640) (such as a cloud platform or a local server and/or a personal mobile intelligent terminal) in cooperation with each other.

As shown in FIG. 1 and FIG. 8, the remote management unit 600 provided in this way can use the government industry management client software 610 to receive and display the driver status monitoring result forwarded by the vehicle-mounted gateway unit 300 and the communication center 640 for the driver emotion/fatigue monitoring unit 200, issue relevant management instructions to manage the driver based on the received driver status monitoring result; and when the received driver status monitoring result is seriously abnormal, start the emergency management process and issue relevant emergency response instructions.

The remote management unit 600 can use the enterprise operation management client software 620 to receive and display the driver status monitoring result sent by the driver emotion/fatigue monitoring unit 200 or forwarded by the vehicle-mounted gateway unit 300 and the communication center 640 for the driver emotion/fatigue monitoring unit 200, issue relevant management instructions to manage the driver based on the received driver status monitoring result; and when the received driver status monitoring result is seriously abnormal, start the emergency management process, send an emergency warning to the government industry management client, and issue relevant emergency response instructions.

The remote management unit 600 can use the driver and passenger service client software 630 to receive and display the driver status monitoring result sent by the driver emotion/fatigue monitoring unit 200 or forwarded by the vehicle-mounted gateway unit 300 and the communication center 640 for the driver emotion/fatigue monitoring unit 200, and send a relevant warning prompt according to the received driver status monitoring result.

The remote management unit 600 can use the communication center 640 to communicate with the vehicle-mounted gateway unit 300, and receive and store the current driver facial expression dynamic information captured by the facial high-speed camera device in the real-time emotion recognition module 210 of the driver emotion/fatigue monitoring unit 200 and forwarded by the vehicle-mounted gateway unit 300 for the driver emotion/fatigue monitoring unit 200, the current driver head and face movement information acquired by the head and face video acquisition device in the fatigue status monitoring module 230, and the pressure information of different points of the seat under the driver's body or the driver status monitoring result acquired by the seat pressure status acquisition device. When the emotion intelligent analysis and recognition component, the fatigue status analysis component based on video analysis, or the fatigue status analysis component based on sensor network analysis are set in the remote management unit 600, the emotion intelligent analysis and recognition and fatigue status analysis and determination can be performed through the cloud platform or local server of the communication center 640).

The communication center 640 herein serves as the computer system environment for the government industry management client software 610, the enterprise operation management client software 620, and the driver and passenger service client software 630 at the same time, supports related software applications, and forwards management instructions or response instructions of the government industry management client software 610, the enterprise operation management client software 620, and the driver and passenger service client software 630 to the vehicle-mounted gateway unit 300.

When the driving safety management system based on driver emotion and fatigue analysis in this embodiment is used in commercial vehicles, the remote management unit 600 generally needs to have the government industry management client 610, the enterprise operation management client 620, the driver and passenger service client 630, and the communication center 640 at the same time. When the driving safety management system based on driver emotion and fatigue analysis in this embodiment is used in non-commercial transport vehicles, the remote management unit 600 may not have the government industry management client 610. When the driving safety management system based on driver emotion and fatigue analysis is used in private vehicles, the remote management unit 600 may not have the government industry management client 610 and the enterprise operation management client 620, the driver and passenger service client 630 may only reserve a driver service client 631, and the communication center 640 may only reserve a driver service client 643.

On this basis, the present invention further specifies specific devices that may be involved in modules of each unit of the driving safety management.

Figure 3:
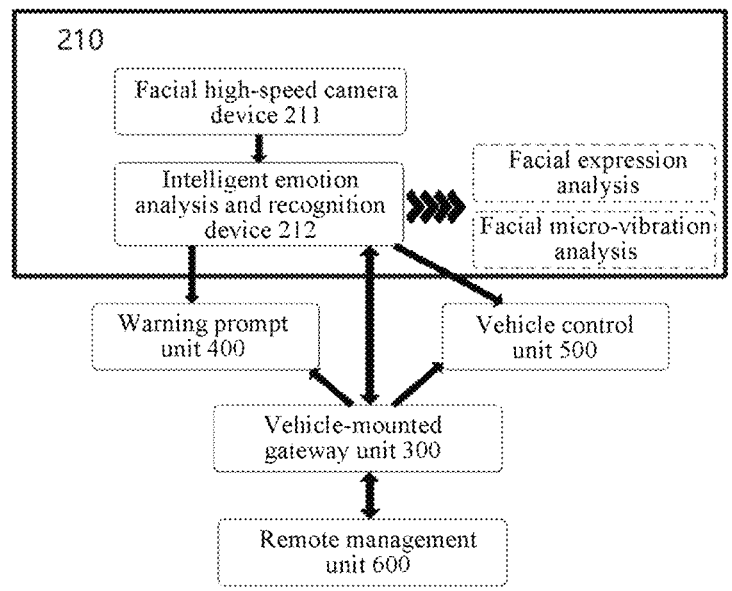
FIG. 3 is a schematic diagram of a composition principle and a usage procedure of an emotion recognition module of a driver emotion/fatigue monitoring unit according to an embodiment of the present invention.

FIG. 3 is a schematic diagram of a composition principle and a usage procedure of the real-time emotion recognition module 210 in the driver emotion/fatigue monitoring unit 200 applied to a driving safety management system in this embodiment.

As shown in FIG. 3, the real-time emotion recognition module 210 in the driver emotion/fatigue monitoring unit 200 applied to a driving safety management system in this embodiment includes a facial high-speed camera device 211 and an intelligent emotion analysis and recognition device 212.

The facial high-speed camera device 211 herein is configured to capture the current driver facial expression dynamics. The facial high-speed camera device 211 includes, but is not limited to, an external high-speed video capturing camera and a built-in high-speed video capturing camera. The types of the facial high-speed camera device include but are not limited to a visible light high-speed video capturing camera, a near-infrared high-speed video capturing camera, a special high-speed camera for capturing 3D facial expression dynamics or a 3D high-speed facial expression dynamic capturing instrument; and are determined according to vehicle installation conditions and carrier management requirements, and are not limited herein.

The emotion intelligent analysis and recognition device 212 herein is configured to perform intelligent analysis and recognition on the facial expression dynamics captured by the facial high-speed camera device 211, and determine a current driver real-time emotion status. The form of the emotion intelligent analysis and recognition device includes but is not limited to an emotion intelligent analysis and recognition component built in the driver emotion/fatigue monitoring unit, an emotion intelligent analysis and recognition component in the vehicle-mounted gateway unit, and an emotion intelligent analysis and recognition component in the remote management unit. Furthermore, the type of the emotion intelligent analysis and recognition device includes but is not limited to facial expression analysis, micro-expression analysis, and facial micro-vibration analysis according to different technical principles. The details are determined according to vehicle installation conditions and carrier management requirements, and are not limited herein.

Figure 4:
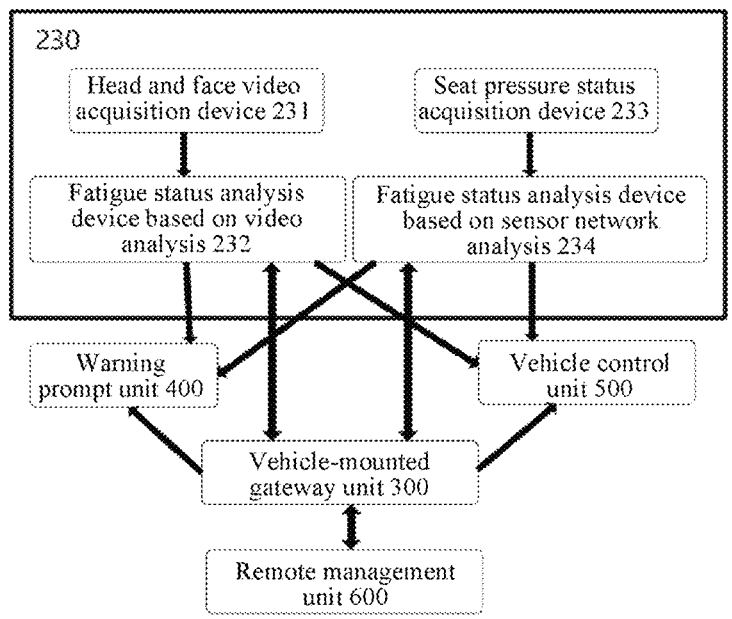
FIG. 4 is a schematic diagram of a composition principle and a usage procedure of a fatigue status monitoring module of a driver emotion/fatigue monitoring unit according to an embodiment of the present invention.

FIG. 4 is a schematic diagram of a composition principle and a usage procedure of a fatigue status monitoring module 230 in the driver emotion/fatigue monitoring unit 200 applied to a driving safety management system in this embodiment.

As shown in FIG. 4, the fatigue status monitoring module 230 in the driver emotion/fatigue monitoring unit 200 applied to a driving safety management system in this embodiment includes a head and face video acquisition device 231 and a fatigue status analysis device 232 based on video analysis, a seat pressure status acquisition device 233, and a fatigue status analysis device 234 based on sensor network analysis.

The head and face video acquisition device 231 is configured to acquire current driver head and face movements. The head and face video acquisition device includes but is not limited to an external video acquisition camera and an embedded video acquisition camera; and the type of the head and face video acquisition device includes but is not limited to a visible light video acquisition camera and a near-infrared video acquisition camera: which are determined based on vehicle installation conditions and carrier management requirements, and are not limited herein.

Herein, the fatigue status analysis device 232 based on video analysis is configured to intelligently analyze and recognize the head and face movements collected by the head and face video acquisition device 231 and determine current driver real-time fatigue. The fatigue status analysis device based on video analysis includes but is not limited to a fatigue status analysis component based on video analysis built in the driver emotion/fatigue monitoring unit, a fatigue status analysis component based on video analysis in the vehicle-mounted gateway unit, and a fatigue status analysis component based on video analysis in the remote management unit. The details are determined according to vehicle installation conditions and carrier management requirements, and are not limited herein.

Herein, the seat pressure status acquisition device 233 is configured to acquire pressure distribution of different points of a seat under the driver's body. The seat pressure status acquisition device includes but is not limited to an external seat cushion laid on the seat, a pressure sensor on the backrest, and an embedded pressure sensor built in the seat. The type of the seat pressure status acquisition device includes but is not limited to piezoelectric sensors, piezoresistive sensors, and strain gauge sensors based on different technical principles. The details are determined according to vehicle installation conditions and carrier management requirements, and are not limited herein.

Herein, the fatigue status analysis device 234 based on sensor network analysis is configured to intelligently analyze and recognize the pressure distribution of the different points of the seat under the driver's body acquired by the seat pressure status acquisition device 233, and determine the current driver real-time fatigue. The fatigue status analysis device 234 based on sensor network analysis includes but is not limited to a fatigue status analysis component based on sensor network analysis built in the driver emotion/fatigue monitoring unit, a fatigue status analysis component based on sensor network analysis in the vehicle-mounted gateway unit, and a fatigue status analysis component based on sensor network analysis in the remote management unit. The details are determined according to vehicle installation conditions and carrier management requirements, and are not limited herein.

Based on this, the driver emotion/fatigue monitoring unit 200 including the real-time emotion recognition module 210 and the fatigue status monitoring module 230 can be directly associated with the vehicle control unit 500 or indirectly associated with the vehicle control unit 500 and/or the remote management unit 600 through the vehicle-mounted gateway unit 300 when deployed.

When the driver emotion/fatigue monitoring unit 200 is directly associated with the vehicle control unit 500, and the driver real-time emotion recognition result and/or the fatigue status monitoring result reaches or exceeds a danger threshold, the vehicle control unit 500 controls the speed limitation, speed reduction or emergency braking of the vehicle, and the warning prompt unit issues a dangerous status warning prompt, and an analysis and recognition or determination result and an action status of the vehicle control unit are uploaded to the remote management unit 600 through the vehicle-mounted gateway unit 300.

After the driver emotion/fatigue monitoring unit 200 is indirectly associated with the vehicle control unit 500 through the vehicle-mounted gateway unit 300, and the driver real-time emotion recognition result and/or the fatigue status monitoring result reaches or exceeds a danger threshold, the vehicle-mounted gateway unit 300 sends an instruction to the vehicle control unit 500, the vehicle control unit 500 controls the speed limitation, speed reduction or emergency braking of the vehicle, and the warning prompt unit issues a dangerous status warning prompt, and an analysis and recognition or determination result and an action status of the vehicle control unit 500 are uploaded to the remote management unit 600 through the vehicle-mounted gateway unit 300.

When the driver emotion/fatigue monitoring unit 200 is indirectly associated with the vehicle control unit 500 through the vehicle-mounted gateway unit 300, but the fatigue status analysis component based on video analysis or the fatigue status analysis component based on sensor network analysis is in the remote management unit 600, the current driver facial expression dynamic information acquired by the facial high-speed camera device in the real-time emotion recognition module 210 in the driver emotion/fatigue monitoring unit 200, the current driver head and face movement information acquired by the head and face video acquisition device in the fatigue status monitoring module 230, and the pressure information of different points of the seat under the driver's body acquired by the seat pressure status acquisition device are uploaded to the remote management unit 600 through the vehicle-mounted gateway unit 300. The remote management unit 600 performs intelligent analysis, recognition, or determining and then returns the analysis and recognition or determination result to the vehicle-mounted gateway unit 300, and the vehicle-mounted gateway unit 300 sends instructions to the vehicle control unit 500; the vehicle control unit 500 controls speed limitation, speed reduction, or emergency braking of the vehicle, the warning prompt unit 400 sends a dangerous status warning prompt, and the action status of the vehicle control unit 500 is uploaded to the remote management unit through the vehicle-mounted gateway.

FIG. 5 is a schematic diagram of a composition principle of the vehicle-mounted gateway unit 300 and a network communication module thereof in a driving safety management system based on driver emotion and fatigue analysis according to this embodiment.

Based on FIG. 5, the network communication module 310 in the vehicle-mounted gateway unit 300 applied to a driving safety management system in this embodiment includes a 5G communication device 311, a CAN bus communication device 312, a TCP/IP communication device 313, a Bluetooth (Bluetooth) communication device 314, and other wireless communication (Wi-Fi, UWB, Zigbee, or the like) devices 315.

The network communication module 310 can use the 5G communication device 311 to perform communication between the vehicle-mounted gateway unit 300 and the remote management unit 600.

The network communication module 310 can use the CAN bus communication device 312 to implement CAN bus wired communication between the vehicle-mounted gateway unit 300 and the driver emotion/fatigue monitoring unit 200, the warning prompt unit 400 and the vehicle control unit 500.

The network communication module 310 can use the TCP/IP communication device 313 to implement TCP/IP wired communication or wireless communication between the vehicle-mounted gateway unit 300 and the driver emotion/fatigue monitoring unit 200, the warning prompt unit 400, the vehicle control unit 500, and the remote management unit 600.

The network communication module 310 can use the Bluetooth (Bluetooth) communication device 314 to implement wireless communication based on the Bluetooth (Bluetooth) protocol between the vehicle-mounted gateway unit 300 and the driver emotion/fatigue monitoring unit 200 and the warning prompt unit 400.

The network communication module 310 can use other wireless communication (Wi-Fi, UWB, Zigbee, or the like) devices 314 to implement wireless communication based on corresponding protocols such as Wi-Fi, UWB, and Zigbee between the vehicle-mounted gateway unit 300 and the driver emotion/fatigue monitoring unit 200 and the warning prompt unit 400.

As a preferred solution, the network communication module 310 in this embodiment has at least three communication devices such as the 5G communication device 311, the CAN bus communication device 312, and the TCP/IP communication device 313, and configuration of other wireless communication devices is determined according to a specific communication mode of the camera and sensor installed on the vehicle, which is not limited herein.

Based on FIG. 5, the data storage module 320 in the vehicle-mounted gateway unit 300 applied to a driving safety management system in this embodiment includes a built-in data storage device and an external data storage device.

The built-in data storage device is configured to store the current driver facial expression dynamic information and/or pressure distribution information of different points of the seat under the driver's body uploaded by the driver emotion/fatigue monitoring unit. The built-in data storage device specifically includes, but is not limited to, a built-in static random access memory SRAM, a built-in dynamic random access memory DRAM, a built-in hard disk, and a built-in read-only memory ROM.

The external data storage device herein includes but is not limited to an external mobile hard disk, a USB flash drive, a TF memory card, an SD memory card, a rewritable CD-RW, a DVD-RAM disc, a non-rewritable CD-ROM, and a DVD-ROM disc.

As shown in FIG. 5, the edge computing module 330 in the vehicle-mounted gateway unit 300 applied to a driving safety management system in this embodiment includes an AI intelligent chip with an edge computing function and a terminal SDK with edge computing.

Herein, the circuit board AI intelligent chip with an edge computing function and the terminal SDK with edge computing are configured to perform emotion intelligent analysis and recognition and/or fatigue status analysis and determination on the current driver facial expression dynamic information and/or pressure distribution information of different points of the seat under the driver's body uploaded by the driver emotion/fatigue monitoring unit.

According to this, the vehicle-mounted gateway unit 300 jointly formed by the network communication module 310, the data storage module 320, and the edge computing module 330 can be directly associated with the driver emotion/fatigue monitoring unit 200, the vehicle control unit 500, the warning prompt unit 400 and the remote management unit 500 in specific deployment.

When the vehicle-mounted gateway unit 300 receives the driver emotion or fatigue status analysis abnormal result, the vehicle-mounted gateway unit 300 sends an instruction to the vehicle control unit 500 to control the speed limitation, speed reduction or emergency braking of the vehicle, sends a dangerous status warning to the warning prompt unit 400 and uses a voice prompt to prompt the driver to eliminate abnormal emotions or prompt the driver to park and rest nearby, and forwards the driver status monitoring result and action information of the vehicle control unit to the remote management unit 600.

When the fatigue status analysis component based on video analysis or the fatigue status analysis component based on sensor network analysis are in the remote management unit 600, the vehicle-mounted gateway unit 300 forwards the current driver facial expression dynamic information captured by the facial high-speed camera device, the current driver head and face movement information acquired by the head and face video acquisition device, and the pressure information of different points of the seat under the driver's body acquired by the seat pressure status acquisition device to the remote management unit 600; receives the analysis and recognition or determination result obtained by the remote management unit 600 after analysis and recognition or determining and sends an instruction to the vehicle control unit 500 and/or the warning prompt unit 400, and then uploads the action status of the vehicle control unit to the remote management unit 600.

Further referring to FIG. 6, the warning prompt unit 400 in this embodiment can be directly associated with the driver emotion/fatigue monitoring unit 200 and the vehicle-mounted gateway unit 300 during specific deployment.

When the driver emotion recognition result or the fatigue status monitoring result received by the vehicle local warning prompt subunit and sent by the driver emotion/fatigue monitoring unit 200 or sent by the driver emotion/fatigue monitoring unit 200 through the vehicle-mounted gateway unit 300 is abnormal, the warning prompt unit 400 sends a sound and light warning and voice prompts the driver to adjust emotions, concentrate, or park nearby.

When the driver emotion recognition result or the fatigue status monitoring result received by the vehicle local warning prompt subunit and sent by the driver emotion/fatigue monitoring unit 200 or sent by the driver emotion/fatigue monitoring unit 200 through the vehicle-mounted gateway unit 300 is seriously abnormal, the warning prompt unit 400 sends a sound and light warning inside and outside the vehicle and voice prompts the driver inside and outside the vehicle to adjust emotions, concentrate, or park nearby, and prompts passers-by to be alert to abnormal vehicles, avoid them in time or call the police immediately.

When the driver emotion recognition result or the fatigue status monitoring result received by the remote monitoring client software warning prompt subunit and sent by the driver emotion/fatigue monitoring unit 200 through the vehicle-mounted gateway unit 300 and the communication center is abnormal, the warning prompt unit 400 sends a warning prompt or sends a voice prompt.

When the driver emotion recognition result or the fatigue status monitoring result received by the remote monitoring client software warning prompt subunit and sent by the driver emotion/fatigue monitoring unit 200 through the vehicle-mounted gateway unit 300 and the communication center is seriously abnormal, the warning prompt unit 400 sends an emergency warning and a voice prompt and starts the emergency management process according to the emergency plan by default.

Figure 9:
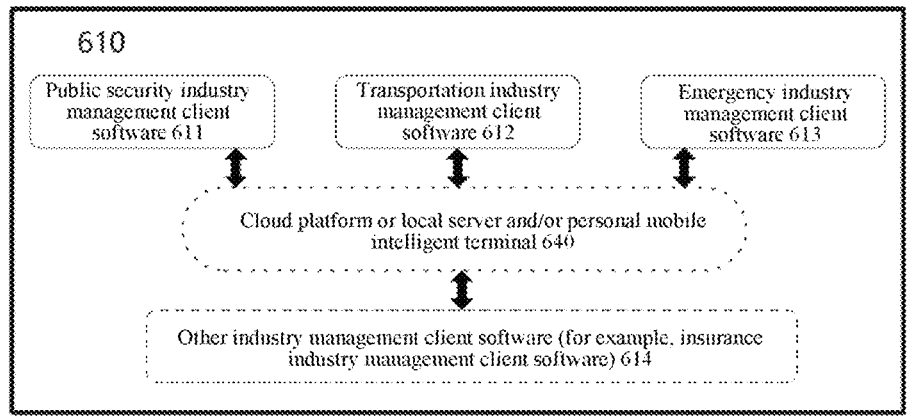
FIG. 9 is a schematic diagram of a composition principle of a government industry management client of a remote management unit according to an embodiment of the present invention.

FIG. 9 is a schematic diagram of a composition principle of the government industry management client 610 of the remote management unit in a driving safety management system in this embodiment.

Based on FIG. 9, the government industry management client 610 of the remote management unit 600 applied to a driving safety management system in this embodiment includes public security industry management client software 611, transportation industry management client software 612, emergency industry management client software 613, and other industry management client software 614 (for example, insurance industry management client software) according to different industry departments.

The public security industry management client software 611 in the government industry management client 610 is used for the driver abnormal emotion and fatigue status monitoring warning. The driver abnormal emotion and fatigue status monitoring warning unit can receive and display the driver abnormal emotion and fatigue status monitoring warning information, and when receiving a high-risk warning, can send warning information to the enterprise operation management client and the driver and passenger service client in the form of text, image, voice, file, or the like and send linkage management information according to the setting of the emergency plan.

The transportation industry management client software 612 in the government industry management client 610 is used for the driver abnormal emotion and fatigue status monitoring warning. The driver abnormal emotion and fatigue status monitoring warning unit can receive and display the driver abnormal emotion and fatigue status monitoring warning information, and when receiving a high-risk warning, can send warning information to the enterprise operation management client and the driver and passenger service client in the form of text, image, voice, file, or the like and send linkage management information according to the setting of the emergency plan.

The emergency industry management client software 613 in the government industry management client 610 is used for the driver abnormal emotion and fatigue status monitoring warning. The driver abnormal emotion and fatigue status monitoring warning unit can receive and display the driver abnormal emotion and fatigue status monitoring warning information, and when receiving a high-risk warning, can send warning information to the enterprise operation management client and the driver and passenger service client in the form of text, image, voice, file, or the like and send linkage management information according to the setting of the emergency plan.

Other industry management client software (such as insurance industry management client software) 614 in the government industry management client 610 is configured to query the driver abnormal emotion and fatigue status monitoring warning record. The driver abnormal emotion and fatigue status monitoring warning record query supports querying the driver abnormal emotion and fatigue status monitoring warning record information of a vehicle through a driver name, a vehicle license plate number, and a specified time range.

Other industry management client software also supports function customization according to corresponding industry management needs, or independently chooses to enable or disable related monitoring client functions within the scope of user authority, which is not limited herein.

Figure 10:
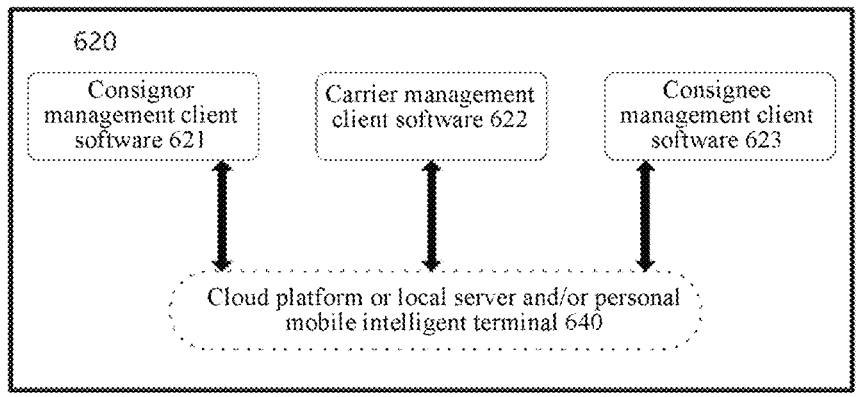
FIG. 10 is a schematic diagram of a composition principle of an enterprise operation management client of a remote management unit according to an embodiment of the present invention.

FIG. 10 is a schematic diagram of a composition principle of the enterprise operation management client 620 of the remote management unit in a driving safety management system in this embodiment.

Based on FIG. 10, the enterprise operation management client 620 of the remote management unit 600 applied to a driving safety management system in this embodiment includes consignor management client software 621, carrier management client software 622, and consignee management client software according to different users 623.

The consignor management client software 621 in the enterprise operation management client 620 is configured to query the driver abnormal emotion and fatigue status monitoring warning record. As an example, the driver abnormal emotion and fatigue status monitoring warning record query supports querying the driver abnormal emotion and fatigue status monitoring warning record information of a vehicle through a driver name, a vehicle license plate number, and a specified time range.

The carrier unit management client software 622 in the enterprise operation management client 620 is configured to perform driver abnormal emotion and fatigue status monitoring warning.

As an example, the driver abnormal emotion and fatigue status monitoring warning unit can receive and display the driver abnormal emotion and fatigue status monitoring warning information, and when receiving the warning, sends warning information to the driver and passenger service client in the form of text, image, voice, file, or the like, and when receiving a high-risk warning, sends warning information to the driver and passenger service client in the form of text, image, voice, file, or the like, and immediately implements the emergency plan.

The consignee management client software 623 in the enterprise operation management client 620 is configured to query the driver abnormal emotion and fatigue status monitoring warning record. As an example, the driver abnormal emotion and fatigue status monitoring warning record query supports querying the driver abnormal emotion and fatigue status monitoring warning record information of a vehicle through a driver name, a vehicle license plate number, and a specified time range.

When the driving safety management system based on driver emotion and fatigue analysis in this embodiment is used for commercial vehicles of cargo transportation, the enterprise operation management client 620 of the remote management unit 600 usually has the consignor management client software 621, the carrier management client software 622, and the consignee management client software 623. When the driving safety management system based on driver emotion and fatigue analysis in this embodiment is used for commercial vehicles of passenger transportation, non-commercial official vehicles, and non-commercial transport vehicles, the enterprise operation management client 620 of the remote management unit 600 can only reserve the carrier management client software 622. When the driving safety management system based on driver emotion and fatigue analysis in this embodiment is used for private vehicles, the remote management unit 600 may not have the enterprise operation management client 620.

Figure 11:
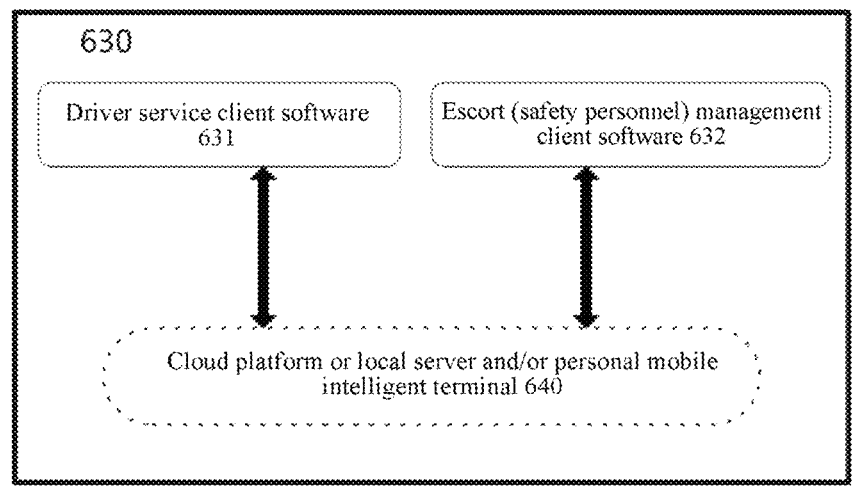
FIG. 11 is a schematic diagram of a composition principle of a driver and passenger service client of a remote management unit according to an embodiment of the present invention.

FIG. 11 is a schematic diagram of a composition principle of the driver and passenger service client 630 of the remote management unit in a driving safety management system based on driver emotion and fatigue analysis in this embodiment.

Based on FIG. 11, the driver and passenger service management client 630 of the remote management unit 600 applied to a driving safety management system in this embodiment includes driver service client software 631 and escort (safety personnel) service client software 632 according to different users.

The driver and passenger service client software 631 in the driver and passenger service client 630 is configured to perform driver abnormal emotion and fatigue status monitoring warning.

As an example, the driver abnormal emotion and fatigue status monitoring warning unit can receive and display the driver abnormal emotion and fatigue status monitoring warning information, when receiving a medium-risk or low-risk level warning, send warning information through voice or specific preset sound, and when receiving a high-risk warning sent by the government industry management client and the carrier management client, send warning information in the form of high-level warning content setting voice or specific high-level warning preset sound, and support feedback of a correction status and a corrective measure in the form of text, image, voice, file, or the like within a specified time.

The escort (safety personnel) service client software 632 in the driver and passenger service client 630 is configured to perform driver abnormal emotion and fatigue status monitoring warning.

As an example, the driver abnormal emotion and fatigue status monitoring warning unit can receive and display the driver abnormal emotion and fatigue status monitoring warning information, when receiving a medium-risk or low-risk level warning, send warning information through voice or specific preset sound, and when receiving a high-risk warning sent by the government industry management client and the carrier management client, send warning information in the form of high-level warning content setting voice or specific high-level warning preset sound, to continuously voice prompt the escort (safety personnel) to supervise the driver to adjust the abnormal emotion or park and rest when appropriate, and support feedback of a correction status and a corrective measure in the form of text, image, voice, file, or the like within a specified time.

When the driving safety management system based on driver emotion and fatigue analysis in this embodiment is used for commercial vehicles of dangerous goods transportation, the escort (safety personnel) service client software 632 in the driver and passenger service client 630 of the remote management unit 600 is usually the escort service client software. When the driving safety management system based on driver emotion and fatigue analysis in this embodiment is used for passenger transport vehicles or school buses, the escort (safety officer) service client software 632 in the driver and passenger service client 630 of the remote management unit 600 is usually the security personnel service client software. When the driving safety management system based on driver emotion and fatigue analysis in this embodiment is used for passenger and cargo transport vehicles or private vehicles that do not require escorts, security personnel or co-drivers, the driver and passenger service client 630 of the remote management unit 600 may not have escort (security personnel) service client software.

Figure 12:
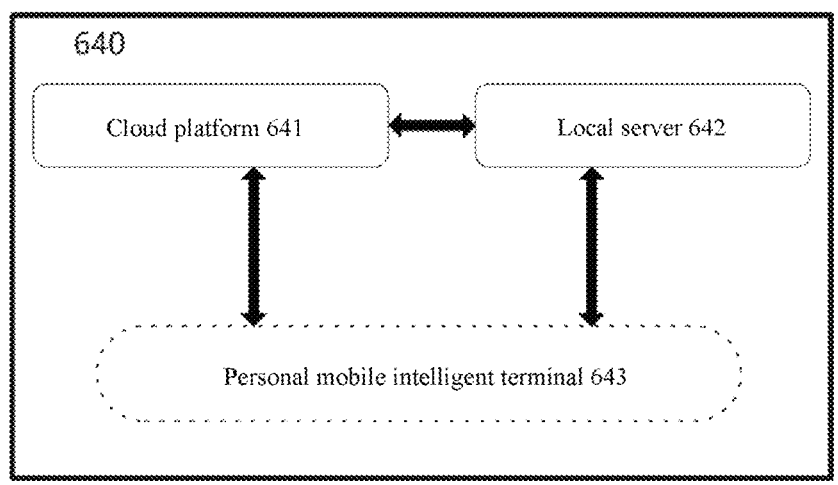
FIG. 12 is a schematic diagram of a composition principle of a communication center of a remote management unit according to an embodiment of the present invention.

FIG. 12 is a schematic diagram of a composition principle of the communication center 640) in the remote management unit in a driving safety management system based on driver emotion and fatigue analysis in this embodiment.

Based on FIG. 12, the communication center 640 of the remote management unit 600 applied to a driving safety management system provided in this embodiment includes a cloud platform 641, a local server 642, and a personal mobile intelligent terminal 643.

In this embodiment, preferably, a communication center application mode in which a cloud platform is combined with a personal mobile intelligent terminal is used, and can be determined according to the actual communication conditions of different users, and is not limited herein.

The cloud platform 641 in this communication center 640 is configured to store data information uploaded by the driver emotion/fatigue monitoring unit 200, perform intelligent analysis, recognition, and determining of the data information uploaded by the driver emotion/fatigue monitoring unit 200, receive data from the government industry management client software 610/enterprise operation management client software 620/driver and passenger service client software 630 and call a shared data resource pool, support computer hardware platform environments applied in the government industry management client software 610/enterprise operation management client software 620/driver and passenger service client software 630, and perform communication interaction between the government industry management client software 610/enterprise operation management client software 620/driver and passenger service client software 630 and the vehicle-mounted gateway unit 300.

The cloud platform 641 communicates with the vehicle-mounted gateway unit 300, receives and stores the current driver facial expression dynamic information captured by the facial high-speed camera module 211 in the real-time emotion recognition module 210 in the driver emotion/fatigue monitoring unit 200 and forwarded by the vehicle-mounted gateway unit 300 for the driver emotion/fatigue monitoring unit 200, the current driver head and face movement information acquired by the head and face video acquisition device 231 in the fatigue status monitoring module 230, and the pressure information of different points of the seat under the driver's body or the driver status monitoring result acquired by the seat pressure status acquisition device 233.

When the emotion intelligent analysis and recognition component, the fatigue status analysis component based on video analysis, or the fatigue status analysis component based on sensor network analysis are set on the cloud platform 641, biometric information comparison, the emotion intelligent analysis and recognition, and fatigue status analysis determination are performed by the cloud platform 641, and management instructions or response instructions of the government industry management client software 610, the enterprise operation management client software 620, and the driver and passenger service client software 630 are forwarded to the vehicle-mounted gateway unit 300.

The cloud platform 641 supports B/S monitoring client applications, and the B/S monitoring client is developed based on the latest version of China's high-security operating system and China's high-security Xinchuang browser.

The local server 642 in this communication center 640 is configured to store data information uploaded by the driver emotion/fatigue monitoring unit 200, perform intelligent analysis, recognition, and determining of the data information uploaded by the driver emotion/fatigue monitoring unit 200, receive data from the government industry management client software 610/enterprise operation management client software 620/driver and passenger service client software 630 and call a data source, support computer hardware platform environments applied in the government industry management client software 610/enterprise operation management client software 620/driver and passenger service client software 630, and perform communication interaction between the government industry management client software 610/enterprise operation management client software 620/driver and passenger service client software 630 and the vehicle-mounted gateway unit 300.

The local server 642 communicates with the vehicle-mounted gateway unit 300, receives and stores the current driver facial expression dynamic information captured by the facial high-speed camera module 211 in the real-time emotion recognition module 210 in the driver emotion/fatigue monitoring unit 200 and forwarded by the vehicle-mounted gateway unit 300 for the driver emotion/fatigue monitoring unit 200, the current driver head and face movement information acquired by the head and face video acquisition device 231 in the fatigue status monitoring module 230, and the pressure information of different points of the seat under the driver's body or the driver status monitoring result acquired by the seat pressure status acquisition device 233.

When the emotion intelligent analysis and recognition component, the fatigue status analysis component based on video analysis, or the fatigue status analysis component based on sensor network analysis are set on the local server 642, biometric information comparison, the emotion intelligent analysis and recognition, and fatigue status analysis determination are performed by the local server 642, and management instructions or response instructions of the government industry management client software 610, the enterprise operation management client software 620, and the driver and passenger service client software 630 are forwarded to the vehicle-mounted gateway unit 300.

The local server 642 supports the C/S monitoring client application, and the C/S monitoring client is developed based on various latest-version high-security operating systems of the Linux kernel.

The personal hand-held intelligent terminal 643 in this communication center 640) is used for the online query tool and temporary storage space of the data information uploaded by the driver emotion/fatigue monitoring unit 200, supports computer hardware environments applied in the government industry management mobile client APP software 610/enterprise operation management mobile client APP software 620/driver and passenger service mobile client APP software 630, and performs the communication interaction between the government industry management mobile client APP software 610/enterprise operation management mobile client APP software 620/driver and passenger service mobile client APP software 630 and the cloud platform 641 or the local server 642 and the vehicle-mounted gateway unit 300.

The personal hand-held intelligent terminal 643 communicates with the vehicle-mounted gateway unit 300 through the cloud platform 641 or the local server 642, receives the driver status monitoring warning information forwarded by the vehicle-mounted gateway unit 300 for the driver emotion/fatigue monitoring unit 200 and forwarded by the cloud platform 641 or the local server 642, and forwards the management instruction or response instruction of the government industry management mobile client APP software 610/enterprise operation management mobile client APP software 620/driver and passenger service mobile client APP software 630 to the vehicle-mounted gateway unit 300.

The personal handheld intelligent terminal 643 supports the mobile monitoring client APP application, and the mobile monitoring client APP is developed based on an operating system such as HarmonyOS micro-kernel or Android (Android) based on the Linux kernel.

In this way, the remote management unit 600 including the government industry management client software 610, the enterprise operation management client software 620, the driver and passenger service client software 630 and the communication center 640 is set on a cloud platform and/or a local storage server of the relevant government industry authorities of automobile transportation and/or a personal hand-held intelligent terminal of the relevant management personnel, a cloud platform and/or a local storage server of an automobile transportation enterprise and relevant transportation parties and/or a personal hand-held intelligent terminal of the relevant management personnel, and a personal hand-held intelligent terminal of driver and passenger personnel, and is connected with the vehicle-mounted gateway unit.

In this way, the remote management unit 600 receives the driver emotion and fatigue analysis result sent by the vehicle-mounted gateway unit 300 and gives vehicle management and driver management control instructions, or receives a driver emotion and fatigue information acquisition result sent by the vehicle-mounted gateway unit 300, recognizes, analyze, and determine a driver real-time emotion and fatigue status, gives vehicle management and driver management control instructions based on an emotion recognition result and/or a fatigue status determination result, feeds back the instructions to the vehicle-mounted gateway unit 300, and feeds back the instructions to the warning prompt unit 400 or the vehicle control unit 500 through the vehicle-mounted gateway unit 300, to send a sound and light warning or a voice prompt or control the vehicle to perform speed limitation, speed reduction, or emergent braking.

When the driving safety management system based on driver emotion and fatigue analysis provided in this way runs, the system can monitor the driver real-time emotion status and fatigue status during vehicle driving, and automatically control the vehicle driving status in a linkage manner through active driving assisted by safety prevention and control according to the monitoring result and give a safety warning to the driver, to prevent unsafe driving behaviors due to abnormal emotions and excessive fatigue of the driver, so as to further ensure the safety of automobile transportation.

Finally, it should be noted that the method of the present invention, or specific system units, or some units thereof can be deployed on physical media through program code, such as hard disks, optical discs, or any electronic devices (such as smartphones and computer-readable storage mediums), and when the machine loads and executes the program code (such as a smartphone loads and executes the program code), the machine becomes a device for implementing the present invention. The above method and device of the present invention can also be transmitted in the form of program code through some transmission media, such as cables, optical fibers, or any transmission mode. When the program code is received, loaded and executed by a machine (such as a smartphone), the machine becomes a device for implementing the present invention.

The basic principles, main features, and advantages of the present invention have been shown and described above. Those skilled in the industry should understand that the present invention is not limited by the above-mentioned embodiments. Descriptions in the above-mentioned embodiments and the specification only illustrate the principle of the present invention. The present invention also has various variations and improvements without departing from the spirit and scope of the present invention, which shall fall within the scope claimed in the present invention. The protection scope claimed by the present invention is defined by the appended claims and their equivalents.

What is claimed is:

1. A driving safety management system based on driver emotion and fatigue analysis, comprising:
a driver emotion/fatigue monitoring unit, wherein the driver emotion/fatigue monitoring unit comprises a real-time emotion recognition module and a fatigue status monitoring module;
the real-time emotion recognition module is configured to obtain current driver facial expression dynamics and transmit the obtained facial expression dynamics to an intelligent emotion analysis module of the real-time emotion recognition module or an intelligent emotion analysis module of a vehicle-mounted gateway unit or an intelligent emotion analysis module of a remote management unit through the vehicle-mounted gateway unit, wherein the intelligent emotion analysis module is capable of performing an intelligent emotion analysis directly based on the facial expression dynamics, and a corresponding real-time emotion analysis result is formed; the fatigue status monitoring module is configured to obtain current driver fatigue status monitoring information and transmit the obtained information to a fatigue status determination module of the fatigue status monitoring module or a fatigue status determination module of the vehicle-mounted gateway unit or a fatigue status determination module of the remote management unit through the vehicle-mounted gateway unit, wherein the fatigue status determination module is capable of performing an intelligent fatigue status determination directly based on the received fatigue status monitoring information, and a corresponding fatigue level for determining a current driver real-time status is formed; and the driver emotion/ fatigue monitoring unit can be directly associated with the vehicle control unit or associated with the vehicle control unit through the vehicle-mounted gateway unit according to a real-time emotion recognition result and/or a fatigue status determination result, to control speed limitation, speed control or speed reduction of operation status of an anti-lock brake system module, a speed limit management module, an intelligent brake management module and/or an electronic control brake auxiliary module;

the vehicle-mounted gateway unit, respectively associated with the driver emotion/fatigue monitoring unit, the vehicle control unit, a warning prompt unit, and a remote management unit; wherein the vehicle-mounted gateway unit can further cooperate with the driver emotion/fatigue monitoring unit to monitor the driver facial dynamic expression or facial vibration amplitude and pressure statuses in different areas of the seat under the driver in real time during vehicle driving, comprehensively analyze the driver real-time emotion status, cautiously determine the real-time fatigue level of the driver;

the vehicle control unit, linked to a speed control system and a braking system of the vehicle and associated with the vehicle-mounted gateway unit and the driver emotion/fatigue monitoring unit, wherein the vehicle control unit controls the vehicle driving status according to a driver real-time emotion status analysis result and a fatigue status determination result sent by the driver emotion/fatigue monitoring unit or the vehicle-mounted gateway unit;

the warning prompt unit, respectively connected and coordinated with the driver emotion/fatigue monitoring unit and the vehicle-mounted gateway unit; and the remote management unit, wherein the remote management unit cooperates with the driver emotion/fatigue monitoring unit to complete driver emotion recognition and/or fatigue status determination through the vehicle control unit, and can give corresponding vehicle management and driver management control instructions and feed back the instructions to the vehicle-mounted gateway unit.

2. The driving safety management system according to claim 1, wherein the real-time emotion recognition module of the driver emotion/fatigue monitoring unit comprises a high-speed facial camera device and an intelligent emotion analysis and recognition device;

the high-speed facial camera device is configured to capture the current driver facial expression dynamics; and the intelligent emotion analysis and recognition device is configured to perform intelligent analysis and recognition on the facial expression dynamics captured by the high-speed facial camera device, and determine a current driver real-time emotion status.

3. The driving safety management system according to claim 1, wherein the fatigue status monitoring module of the driver emotion/fatigue monitoring unit comprises a head and face video acquisition device, a fatigue status analysis device based on video analysis, a seat pressure status acquisition device, and a fatigue status analysis device based on sensor network analysis;

the head and face video acquisition device is configured to acquire current driver head and face movements;

the fatigue status analysis device based on video analysis is configured to intelligently analyze and recognize the head and face movements collected by the head and face video acquisition device and determine current driver real-time fatigue;

the seat pressure status acquisition device is configured to acquire pressure distribution of different points of a seat under the driver's body; and the fatigue status analysis device based on sensor network analysis is configured to intelligently analyze and recognize the pressure distribution of the different points of the seat under the driver's body acquired by the seat pressure status acquisition device, and determine the current driver real-time fatigue.

4. The driving safety management system according to claim 1, wherein the driver emotion/fatigue monitoring unit is directly associated with the vehicle control unit or indirectly associated with the vehicle control unit and/or the remote management unit through a vehicle-mounted gateway.

5. The driving safety management system according to claim 1, wherein the vehicle-mounted gateway unit comprises a network communication module and/or a data storage module and/or an edge computing module;

the network communication module comprises one or more of a 5G communication device, a CAN bus communication device, a TCP/IP communication device, a Bluetooth communication device, and other wireless communication devices, and is configured to perform data exchange between the driver emotion/fatigue monitoring unit, the warning prompt unit, the vehicle control unit, and the remote management unit;

the data storage module comprises a built-in data storage device and an external data storage device, and is configured to store data exchanged between the driver emotion/fatigue monitoring unit, the warning prompt unit, the vehicle control unit, and the remote management unit; and the edge computing module comprises an AI intelligent chip with an edge computing function and a terminal SDK with edge computing, and is configured to perform emotion intelligent analysis and recognition and/or fatigue status analysis and determination based on the data exchanged between the driver emotion/fatigue monitoring unit, the warning prompt unit, the vehicle control unit, and the remote management unit.

6. The driving safety management system according to claim 1, wherein the warning prompt unit comprises a vehicle local warning prompt subunit and a remote monitoring client software warning prompt subunit.

7. The driving safety management system according to claim 1, wherein the vehicle control unit comprises an anti-lock brake system module and/or a speed limit management module and/or an intelligent brake management module and/or an electronic control brake auxiliary module;

the anti-lock brake system module is configured to avoid, when an abnormal driver status monitoring result is received, losing control over a vehicle driving direction or skidding that is possible during emergency braking;

the speed limit management module is configured to control a vehicle maximum driving speed when receiving the abnormal driver status monitoring result;

the intelligent brake management module is configured to start the intelligent brake device to reduce a vehicle real-time driving speed when receiving the abnormal driver status monitoring result; and the electronic control brake auxiliary module is configured to rapidly start a full braking force if emergency braking is required when the abnormal driver status monitoring result is received.

8. The driving safety management system according to claim 1, wherein the vehicle control unit is directly associated with the driver emotion/fatigue monitoring unit and the vehicle-mounted gateway unit; and when the vehicle control unit receives an abnormal driver status monitoring result, the vehicle control unit controls vehicle speed limitation, speed reduction, or emergency braking.

9. The driving safety management system according to claim 1, wherein the remote management unit comprises a government industry management client, an enterprise operation management client, a driver and passenger service client, and a communication center;
- the government industry management client of the remote management unit comprises public security industry management client software, transportation industry management client software, emergency industry management client software, and other industry management client software according to different industry departments;
- the enterprise operation management client of the remote management unit comprises consignor management client software, carrier management client software, and consignee management client software according to different users;
- the driver and passenger service management client of the remote management unit comprises driver service client software and escort/security guard service client software according to different; and
- the communication center of the remote management unit comprises a cloud platform, a local server, and a personal mobile intelligent terminal.

10. The driving safety management system according to claim 1, wherein the remote management unit receives the driver emotion or fatigue status monitoring result sent by the vehicle-mounted gateway unit and gives vehicle management and driver management control instructions, or receives a driver emotion or fatigue status monitoring information acquisition result sent by the vehicle-mounted gateway unit, recognizes, analyze, and determine a driver real-time emotion and/or fatigue status, gives vehicle management and driver management control instructions based on an emotion recognition result and/or a fatigue status determination result, feeds back the instructions to the vehicle-mounted gateway unit, and feeds back the instructions to the warning prompt unit or the vehicle control unit through the vehicle-mounted gateway unit, to send a sound and light warning or a voice prompt or control the vehicle.

11. The driving safety management system according to claim 9, wherein the remote management unit receives the driver emotion or fatigue status monitoring result sent by the vehicle-mounted gateway unit and gives vehicle management and driver management control instructions, or receives a driver emotion or fatigue status monitoring information acquisition result sent by the vehicle-mounted gateway unit, recognizes, analyze, and determine a driver real-time emotion and/or fatigue status, gives vehicle management and driver management control instructions based on an emotion recognition result and/or a fatigue status determination result, feeds back the instructions to the vehicle-mounted gateway unit, and feeds back the instructions to the warning prompt unit or the vehicle control unit through the vehicle-mounted gateway unit, to send a sound and light warning or a voice prompt or control the vehicle.

\* \* \* \* \*